US009153058B2

(12) United States Patent
Blas, Jr.

(10) Patent No.: US 9,153,058 B2
(45) Date of Patent: Oct. 6, 2015

(54) DYNAMIC SPLITTING OF CONTENT

(75) Inventor: Joaquin Cruz Blas, Jr., Pacifica, CA (US)

(73) Assignee: Adobe Systems Incorporated, San Jose, CA (US)

( * ) Notice: Subject to any disclaimer, the term of this patent is extended or adjusted under 35 U.S.C. 154(b) by 515 days.

(21) Appl. No.: 13/408,925

(22) Filed: Feb. 29, 2012

(65) Prior Publication Data

US 2013/0222395 A1    Aug. 29, 2013

(51) Int. Cl.
  *G06T 13/80*    (2011.01)
  *G06T 13/20*    (2011.01)

(52) U.S. Cl.
  CPC ............... *G06T 13/80* (2013.01); *G06T 13/20* (2013.01)

(58) Field of Classification Search
  CPC ... G09G 2360/122; G06T 13/80; G06T 13/20
  See application file for complete search history.

(56) References Cited

U.S. PATENT DOCUMENTS

| 6,191,800 | B1 * | 2/2001 | Arenburg et al. ............. 345/505 |
| 6,351,267 | B1 | 2/2002 | Gever et al. |
| 8,922,329 | B2 | 12/2014 | Davis et al. |
| 2004/0222996 | A1 * | 11/2004 | Fraser ........................ 345/553 |
| 2011/0117878 | A1 | 5/2011 | Barash et al. |
| 2013/0127875 | A1 * | 5/2013 | Blas et al. ................... 345/473 |
| 2013/0332337 | A1 | 12/2013 | Tran |

OTHER PUBLICATIONS

Gobbetti et al., "A single pass GPU Ray Casting Framework for Interactive Out-of-core Rendering of Massive Volumetric datasets," Visual Comput, Jun. 6, 2008, pp. 797-806.*
Schepers et al. "7 Coordinate Systems, Transformations and Units," W3C, SVG 1.1, Aug. 16, 2011.*
Jackson et al., "CSS 2D Transformations Module Level 3," W3C, Working Draft, Mar. 20, 2009.*
Mary Lou, "Grungy Random Rotation Menu with jQuery and CSS3," http://tympanus.net/codrops/2010/02/24/grungy-random-rotation-menu-with-jquery-and-css3/. Feb. 24, 2010.*
https://github.com/jquery/jquery-mobile/wiki/Mobile-Safari-rendering-info, GitHub, Inc., Nov. 11, 2011, 5 pages.
http://www.teknocat.org/blog/web-development/show/6/mobile-safari-background-image-scaling-quirk, updated Aug. 20, 2011, Mobile Safari Background Image Scaling Quirk: Blog and Portfolio of Peter Epp, 6 pages.
Stack Exchance, Inc, Stack Overflow, blogs dated Jul. 17, 2011, downloaded from http://stackoverflow.com/questions/6725851/image-size-limitations-in-mobile-safari, 2 pages.
iPhone Dev SDK Forum, "Handling Large Images," Blogs dated Apr. 19, 2010, downloaded from http://www.iphonedevsdk.com/forum/iphone-sdk-development/45883-handling-large-images.html, 5 pages.

* cited by examiner

*Primary Examiner* — Kee M Tung
*Assistant Examiner* — Nicholas R Wilson
(74) *Attorney, Agent, or Firm* — Wolfe-SBMC

(57) ABSTRACT

Methods and systems for dynamically splitting content are disclosed. In some embodiments, content may be received that includes one or more elements to be animated. It may be determined that a size of at least one element of the one or more elements to be animated exceeds a threshold. The at least one element having the size that exceeds the threshold may be split into a plurality of sub-elements. A transform of at least one of the sub-elements may be modified.

20 Claims, 7 Drawing Sheets

Before

After

Screen
(200x100 Pixels)

Max Size of a GPU Texture
(200x200 Pixels)

Actor
(600x200 Pixels)

Before

After

Before

After

Before

After

DYNAMIC SPLITTING OF CONTENT

BACKGROUND

Certain electronic documents may be animated by including within it software code that alters the appearance and structure of the document over time. As an example, a single HTML document (e.g., a webpage) may include HTML elements, Cascading Style Sheet (CSS) elements, JavaScript code and/or embedded assets such as images, videos, and/or audio content. The HTML and CSS portions of the document form a document structure that determines how the document is displayed or rendered by a web browser or the like. Meanwhile, the JavaScript code may be executed by the web browser to manipulate the HTML and CSS elements as well as their properties and/or attributes, thus altering the structure of the document and the manner in which the document is rendered. By altering the structure of the document over time, JavaScript effectively animates the document.

Some animations or multimedia presentations may include one or more actors (e.g., images or other content to be animated) performing various tasks, movements, or transitions on a stage (e.g., a screen or display). For example, a relatively simple animation may include a transition that hides or shows an object in a computer window. Meanwhile, a more complex animation may include a set of two or more actors (e.g., images of human characters), each actor having a set of elements (e.g., head, arms, body, legs, etc.) that may be displayed in a coordinated or choreographed manner to give the viewer the impression that the actors are moving (e.g., walking, jumping, etc.) across the screen.

Some browsers (e.g., browsers for mobile devices, such as cellular phones or tablet devices, etc.) use graphics processing unit (GPU) acceleration to speed up animations. Often in mobile environments, central processing units (CPUs) and other resources are even more constrained than in a desktop environment. For smoother animations, the browser may take snapshot images of elements that are being animated and send them, as texture bitmaps, to the GPU for faster compositing. Some browsers and/or GPUs and/or other component, however, impose limits (e.g., 1024 pixels in the width and/or height dimension) on the dimensions of the snapshot images that are sent to the GPU. When one of those limits is exceeded, the browser may resort to rendering the display list for that element N times, where N is the number of tiles used to represent the element, thereby creating a bottleneck in the animation. The result of these limitations is that, during an animation that moves the element across the screen, the screen is updated with a distracting, checkerboard-type update as a viewer sees pieces of the old scene and pieces of the new scene at the same time as the display is updated piece by piece.

An example of the above-noted limitations can be seen in FIGS. 1A-1B, 2A-2C, and 3. An example screen size is shown in FIG. 1A as 200×100 pixels and an example maximum size of a GPU texture is shown in FIG. 1B as 200×200 pixels.

A 600×200 pixel actor is shown in FIG. 2A as SCENE-A. One example scenario in which an actor may be larger than the screen is a panning scenario. FIG. 2B illustrates an overlay of the maximum GPU texture size of FIG. 1B on top of the 600×200 pixel actor of FIG. 2A. Note that the actor exceeds the maximum size of the GPU texture. As shown in FIG. 2C, the browser animating the scene tiles the actor to half the maximum size, 100×100 pixels. Thus, the actor is tiled into 12 separate tiles. The actor is completely re-rendered into each of the tiles (at different offsets to show a different part of the actor) meaning that the actor in this example must be rendered 12 separate times. The additional renderings are typically performed in software and become a bottleneck for the animation. The effects of that bottleneck are shown in FIG. 3.

FIG. 3 illustrates a sequence of five images showing a scene transition from a smiley face to the scene SC. The smiley face may be one actor and the image representing the scene may also be an actor. When the actor is initially displayed at the start of the animation, it is displayed in pieces (tiles) as the browser finishes rendering each tile asynchronously. The rendering of each tile and the updating of the screen by the GPU occur independently/asynchronously. So as the GPU continually updates the screen with each step of the animation, the browser sends tiles to the GPU as they finish rendering. The result is an undesired checkerboard update effect on the screen/display (as shown in FIG. 3), because all of the tiles finish rendering at different times.

SUMMARY

This specification discloses systems and methods for dynamically splitting content (e.g., elements to be animated). In some embodiments, several techniques described herein may be used to dynamically split content. For example, in one embodiment, content may be received that includes one or more elements to be animated. It may be determined that a size of at least one element of the one or more elements to be animated exceeds a threshold. The at least one element having the size that exceeds the threshold may be split into a plurality of sub-elements. A transform of at least one of the sub-elements may be modified. In one embodiment, the plurality of sub-elements may be rendered in a single pass.

Figure 1A:
FIG. 1A illustrates an example size of a display screen.
Figure 1B:
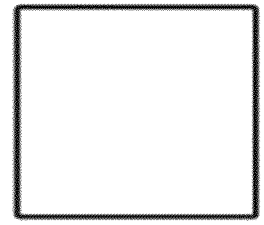
FIG. 1B illustrates an example maximum size of a graphics processing unit (GPU) texture.
Figure 2A:
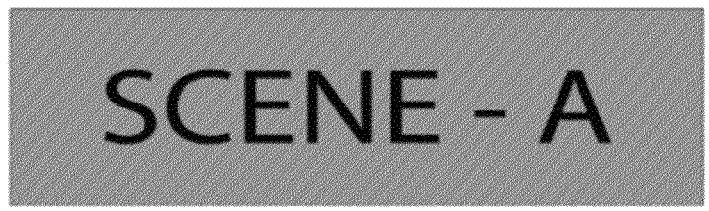
FIGS. 2A-2C illustrate an example tiling of an actor to half the size of the maximum GPU texture.
Figure 2B:
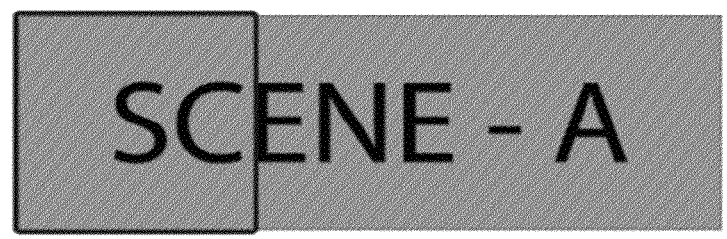
Figure 2C:
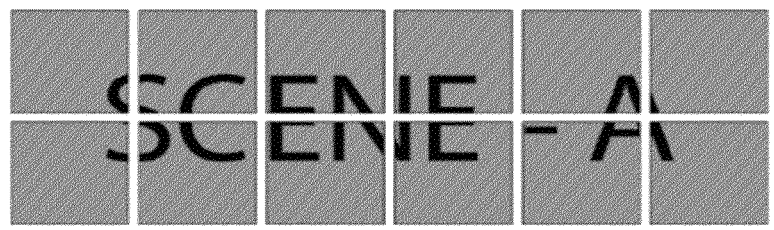

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for an animation engine performing dynamic content splitting into a plurality of sub-elements, the terms "first" and "second" sub-elements can be used to refer to any two of the plurality of sub-elements. In other words, the "first" and "second" sub-elements are not limited to logical sub-elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Actors" or "elements to be animated." As used in, these terms are used to describe images, text, lines, geometric figures (e.g., rectangles, ellipses, circles, rounded rectangles, etc.), two-dimensional (2D) vector graphics, three-dimensional (3D) vector graphics, etc.

This detailed description first discusses an illustrative animation engine, followed by various techniques for performing dynamic content splitting. Lastly, the description discusses a computing system configured to implement certain embodiments disclosed herein. The term "animation," as used throughout this specification, may include an animation, graphical presentation, multimedia content, advertisement, motion picture, film, movie, cartoon, or the like.

Figure 4:
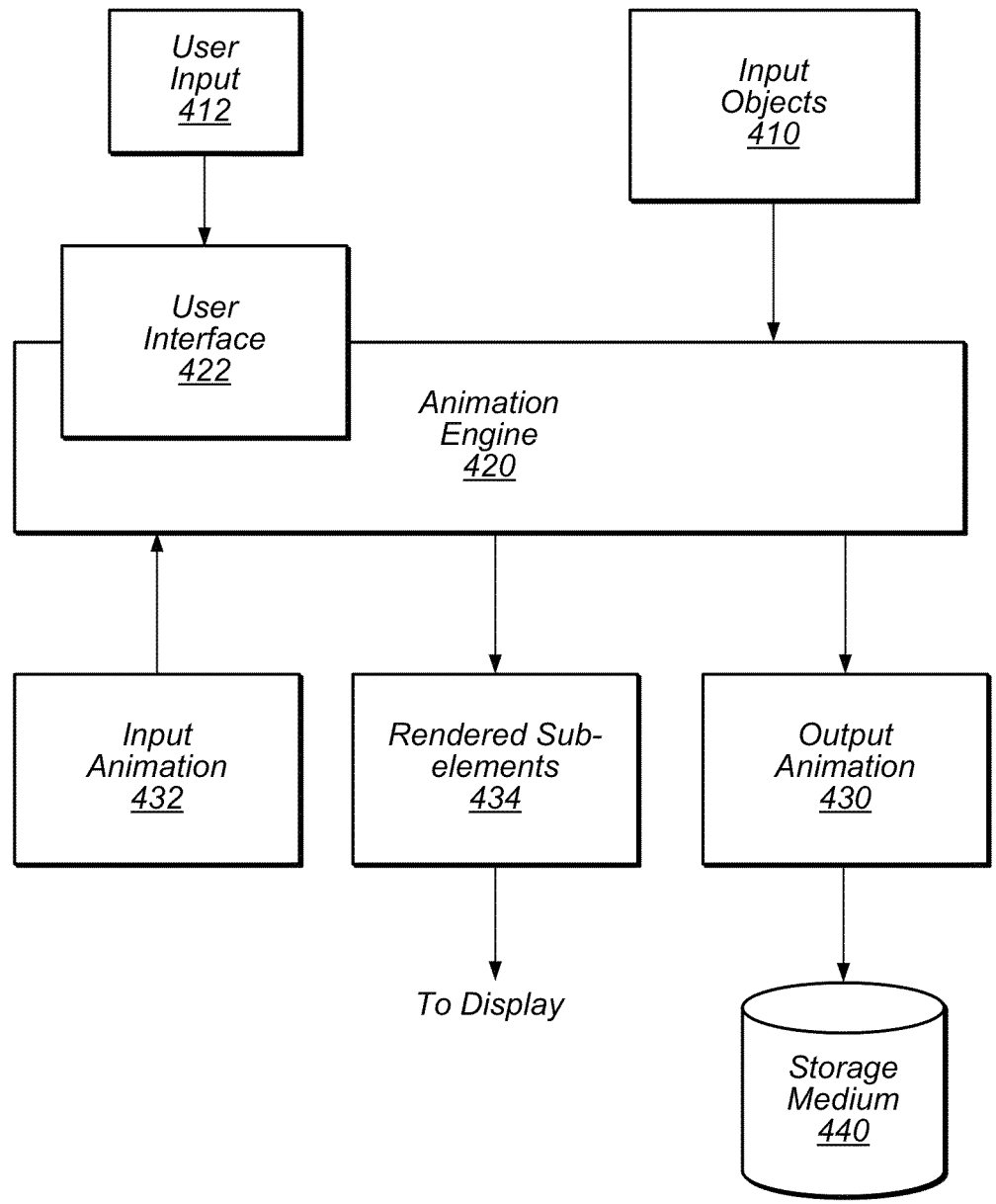
FIG. 4 is a block diagram of an animation engine configured to implement various systems and methods disclosed herein, according to some embodiments.

FIG. 4 shows a block diagram of an example of an animation engine configured to implement one or more of the various systems and methods disclosed herein. In some embodiments, the animation engine may be part of a browser, media player, or other device for playing animations. In other embodiments, the animation engine may be an animation design environment (e.g., animation creation software). In various embodiments, animation engine may be executed on a computing device such as described in FIG. 11, for example. As illustrated, user input 412 may be provided to animation engine 420 via user interface 422 and it may allow a user (e.g., an animation designer or a viewer) to interact with the animation engine. As such, user input 412 may include any kind of input received through any suitable device, such as, for example, a mouse, track pad, touch screen, keyboard, microphone, camera, or the like.

In some embodiments, animation engine 420 may receive input animation 432. Animation engine 420 may receive input animation 432 at run-time and perform the disclosed dynamic splitting techniques. As a result, rendered sub-elements 434 that were dynamically split from an element to be animated may be produced and provided for display. In other embodiments, a modified version of input animation 432 may be produced as output animation 430. The modified version may be a version in which elements to be animated that exceed a threshold are split into various sub-elements. Output animation 430 may be provided for storage in storage medium 440. As described in more detail below, storage medium 440 may include a system memory, a disk drive, DVD, CD, etc. Input animation 432 may be received from a remote location via a network. Input animation 432 may be received via a browser or media player that contains animation engine 420. In other embodiments, input animation 432 may be received as user input 412. Still in other embodiments, animation engine 420 may be animation creation software that enables a developer to create content without regarding to element size, with the resulting output animation 430 having been dynamically split according to the disclosed techniques. In such an embodiment, saving the animation may cause method 500 to execute resulting in dynamically split content.

Accordingly, as described herein, method 500 may execute at run-time of an animation and/or at the time of creation of the animation.

Animation engine 420 may further include a layout engine (not shown) to enable the rendering of web pages or the like. For example, in certain embodiments, animation engine 420 may include a WebKit module that is configured to display web content in windows, to execute JavaScript, and also to implement other browser features (e.g., clickable links, etc.). In other embodiments, however, any other suitable rendering engine may be implemented as part of animation engine 420.

In some embodiments, animation engine 420 may be a component of an Internet browser, media player, or the like, which is configured to display the animation. For example, input animation 432 may be loaded by animation engine 420 of a browser, which provides rendered sub-elements 434 for display. Rendered sub-elements 434 may be rendered in a single pass, according to various embodiments described herein. Not shown, the rendered sub-elements may be provided to a GPU for compositing into a display frame buffer of a display.

In various embodiments, animation engine 420 may be an animation creation software program. To design a new animation, animation engine 420 may receive user input 412 requesting that a new animation file or project be created. Thereafter, the user may request, for example, that one or more input objects 410 (e.g., an image, sound and/or video clip) be added to the animation. Examples of image files and formats include JPEG, JFIF, TIFF, RAW, PNG, GIF, BMP, CGM, SVG, PNS, and JPS, among others. The user may then continue to interact with animation engine 420, for example, by changing a property (e.g., a position, color, font, background, opacity, etc.) of the newly added image over time, which may be graphically represented in a "timeline." Once the animation is created, the animation engine may create output animation 430 and store it in storage medium 440. In creating output animation 430, any elements to be animated having a size greater than the threshold may be automatically dynamically split such that each sub-element has a size equal to or less than the threshold.

In some embodiments, animation engine 420 may include a number of routines, algorithms, functions, and/or libraries that expose an application programming interface (API) that allows a user to create an animation, presentation, multimedia file, or the like. For example, in a case where output animation 430 is encoded in a HyperText Markup Language (HTML) file for display on a web browser or the like (e.g., Internet Explorer®, Firefox®, Safari®, Chrome®, etc.), animation engine 420 may include implementations of scripting languages (e.g., JavaScript) and associated libraries (e.g., jQuery) that allow the user to encode an animation within an HTML file using a particular API. More generally, animation engine 420 may include software code that allows the user to implement any number of technologies such as, for example, HTML, Java, JavaScript, Cascading Style Sheets (CSS), Scalable Vector Graphics (SVG), Canvas (a procedural model that updates bit maps in HTML), etc. that may be suitable for animating content.

In some embodiments, the functions disclosed in the sections presented below may be performed by animation engine 420 implemented by program instructions stored in a computer-readable storage medium and executable by one or more processors (e.g., one or more CPUs or GPUs).

Figure 5:
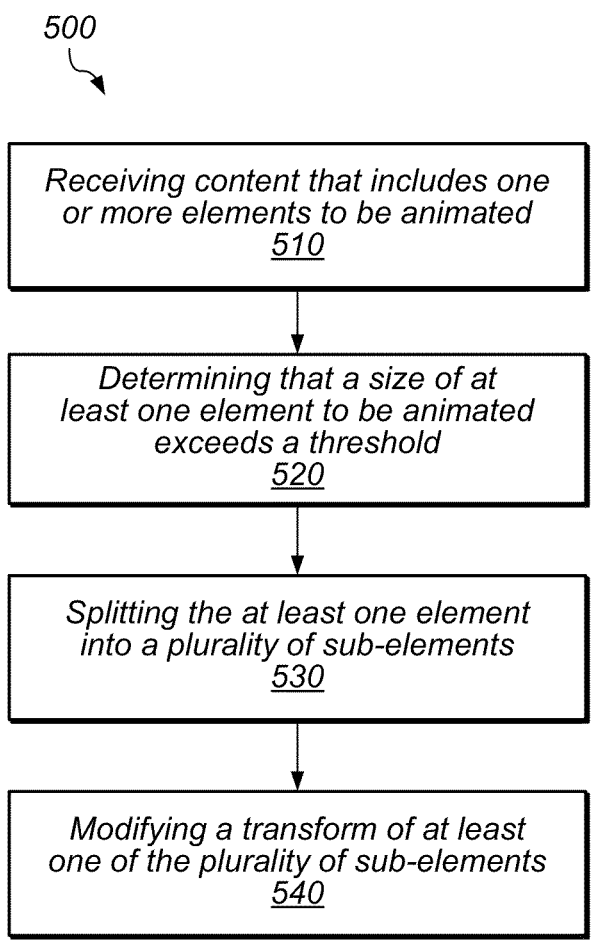
FIG. 5 is a flowchart of a method for dynamic splitting of content, according to some embodiments.

Turning now to FIG. 5, one embodiment of dynamic content splitting is illustrated. While the blocks are shown in a particular order for ease of understanding, other orders may be used. In some embodiments, method 500 of FIG. 5 may include additional (or fewer) blocks than shown. Blocks 510-540 may be performed automatically, may receive user input, or may use a combination thereof. In some embodiments, one or more of blocks 510-540 may be performed by animation engine 420 of FIG. 4.

As illustrated at 510, content that includes one or more elements to be animated may be received. Content may be in the form of an HTML document having structural elements (e.g., HTML, CSS, etc.), programmatic elements (e.g., JavaScript, etc.), and/or other components. Generally speaking, structural elements such as HTML and CSS may define the document's appearance to a viewer. Additionally, programmatic elements or components such as JavaScript may be executed to manipulate the structure of the document by modifying the properties and/or attributes of the HTML and CSS elements, and thereby create an animation. When the animation is not being rendered or performed, the structure of the document may be said to be "static." During the animation, however, the structure (e.g., the properties or attributes of the various HTML or CSS elements) may be dynamically altered, as described herein.

Content may be structured as a display list. A display list may be used to describe how graphical elements are composited together (e.g., specify a rendering order). As a result, the display list may be used as a display graph. The display list may include a hierarchical representation of the elements. The display list may also include a depth that may indicate the rendering and/or compositing order (e.g., for layering of content).

Content may also include and/or be associated with an animation timeline, which may also be received at 510. In one embodiment, an element may be identified as an element to be animated based on the element's presence in the animation timeline. A timeline may serve as a mechanism around which an animation or presentation is synchronized or choreographed. In some embodiments, different portions of an animation may utilize different timelines that are synchronized with a master timeline or the like. For example a first animation of a first element may be synchronized around a first timeline (e.g., to roll content onto a stage) and a second animation of a second element may be synchronized with a second timeline (e.g., to roll the content off the stage) to create a content rotator or the like. Both the first and second timelines may be synchronized with a master timeline. Additionally or alternatively, two or more timelines may be nested within each other so that, for example, an event in one timeline may trigger execution of another timeline. In some cases, elements may be placed on the timeline and then converted to symbols in order to be manipulated. In other cases, elements may be retrieved dynamically during execution of an animation (e.g., from external storage or from a web server).

A timeline may be created in JavaScript in the form of an array of declarative commands or objects. Commands may be tween commands configured to automatically add or modify a series of frames between two existing frames, or may be other instructions, although any other command or object may be enabled in other implementations. Each command has a number of attributes. For example, an attribute may specify that a CSS transformation is being called (e.g., a "style"). An attribute may specify the name of the element that the animation is being applied to. An attribute may specify a portion of the element that is being modified/animated. Other attributes may include an end value of the element in pixels, a time, and/or a duration of the command, among others.

In certain embodiments, a timeline data structure may include a collection of elements, and each element may be a command or object that operates upon an actor to animate that actor (or otherwise modify a value of a property of that actor) over time. In some cases, timeline elements may themselves contain other timelines, thus resulting in a data structure that is tree-like. When implemented in animation engine such as engine 420 of FIG. 4, for instance, a timeline data structure may include any type of command or object supported by the various technologies implemented in that engine (e.g., HTML, Java, JavaScript, CSS, SVG, Canvas, etc.).

In some embodiments, an element of the animation timeline may be associated with a corresponding instruction as to a property (e.g., transform) of the element. For example, an element A may include an instruction in the animation timeline to scale to twice its original size (to animate a "zoom") with particular start and stop times (or start time and duration). As another example, an element A may include an instruction corresponding to a transform to rotate the element at a time t for a duration d.

In one embodiment, the content may be received as a data structure (e.g., a symbol data structure) that defines animation timelines, actors, and tweens/transforms.

As shown at 520, it may be determined that the size of at least one element of the one or more elements to be animated, also referred to herein as actors, exceeds a threshold. In one embodiment, the determining may be performed by searching content that includes the one or more elements. For example, the data structure that defines animation timelines, actors, and tweens/transforms may be scanned.

The threshold may be a maximum size limit in at least one dimension (e.g., height) or in each of multiple dimensions (x and y for 2D; x, y, and z for 3D; etc.). The threshold may be predefined (e.g., 1024×1024 pixels, 2048×2048 pixels, etc.) or it may be based on components of a graphics pipeline. For example, animation engine 420 may scan those components (e.g., device, GPU, CPU, rendering engine, browser, etc.) and set the threshold based on the most limiting component. As one example, a GPU may support up to 1024×1024 pixels and a rendering engine may support up to 2048×2048 pixels. In such an example, animation engine 420 may set the threshold based on the most limiting component, the GPU in the example, such that the threshold is 1024×1024 pixels. In one embodiment, scanning the components to determine the threshold based on the components of the graphics pipeline may be performed prior to the determining at block 520.

At 530, the at least one element having a size that exceeds the threshold may be split into a plurality of sub-elements. Splitting may result in each of the plurality of sub-elements having a size that falls below the threshold. Splitting may include replicating an entry in the display list corresponding to the split element. Accordingly, an entry in the display list corresponding to the element may be replicated into a plurality of entries, each entry representing a sub-element. Replicating an element in the display list may also include replicating a transform and/or other value associated with the respective element. Replicating the transform may occur in the display list, animation timeline, or both. After the replication, the display list that included the original element may include an entry corresponding to each of the sub-elements. As described herein, the replicated entries may likewise include and/or be associated with a transform (e.g., scaling, translation, etc.) associated with the original element/entry.

Note that in some instances, the original element that was split may be one of the plurality of sub-elements. As a result, an element that is split into three sub-elements may include splitting the element twice to result in three sub-elements. In the context of replicating entries in the display list, this may translate into replicating the entry twice resulting in three sub-entries. Although one of the sub-elements may be the original element, the original element may itself be modified to create the sub-element. For example, the element's original size may be modified to reflect the change from element to sub-element. In other embodiments, the original element, after replication, may be removed from the display list. In such an embodiment, for an element that is split into three sub-elements, the original element may be replicated three times resulting in three sub-elements in the display list along with the original element. The original element may then be removed such that the original unmodified element and sub-elements do not coexist in the display list.

Figure 6:
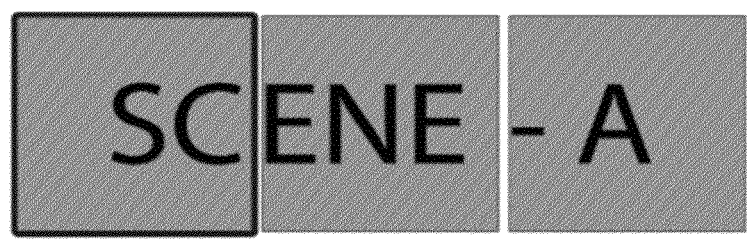
FIG. 6 illustrates an example splitting of an element, according to some embodiments.

The splitting of 530 may be performed to minimize the number of sub-elements. For example, the element that is being split may be split such that it is split into sub-element(s) that are the maximum allowable size (e.g., the threshold) with any remaining portion of the original element split into smaller sub-elements. One example way of doing so is to start splitting into sub-elements from a corner (e.g., upper-left corner, corner closest to the origin of the coordinate system, etc.) of the element. In doing so, the example 600×200 element A of FIG. 6 may be split starting from one of its corners by attempting to split into sub-elements having the maximum allowable size (200×200 pixels in the example). FIG. 6 illustrates a simple example of splitting content using a 200×200 threshold for an element A that is 600×200 pixels. The element may be split/replicated into three separate 200×200 pixel sub-elements A1, A2, and A3. Each of the three sub-elements/sub-actors in the example of FIG. 6 is equal to the 200×200 threshold. By splitting in this manner, the result is three sub-elements. As a result of minimizing the number of sub-elements, the sub-elements may be as close to the threshold as possible. In the 600×200 element example, each of the three resulting sub-elements is the maximum allowable size.

In another embodiment, splitting may include halving the element until each sub-element is below the threshold. Using the example element A from above, such a technique would result in four 150×200 sub-elements. In other examples (e.g., for an 800×200 pixel element), starting from a corner of the element or halving the element may be equally optimal and result in the same number of sub-elements. Other example splitting techniques may also exist, for example, splitting from the center of the element or some other reference point.

In some examples, each sub-element that results from the splitting of 530 may not be the same size. For instance, if the threshold is 200×200 pixels and the element to be animated is 700×200 pixels, three sub-elements may be 200×200 pixels and one sub-element may be 100×200 pixels. Or, using the same threshold, if the element to be animated is 300×300 pixels, one sub-element may be 200×200 pixels, another may be 100×300 pixels, and another may be 200×100 pixels.

Turning back to FIG. 5, in some embodiments, after splitting of elements into sub-elements, elements' sub-elements may be ordered in the display list in the same stacking order in which the elements were originally ordered. Consider a scenario in which a data structure includes elements A and B, in that order. After splitting, each of elements A and B are split into three sub-elements. The sub-elements corresponding to element A may be ordered in the display list before the sub-elements corresponding to element B.

Block 530 (and/or block 520) may be repeated multiple times until each of the elements and sub-elements are sized below the threshold. For example, for each element to be animated that exceeds the size threshold, that element may be duplicated one or more times in a display list or other data structure until each duplicate falls under the threshold.

As illustrated at 540, a transform of at least one of the plurality of sub-elements may be modified. As noted above, an actor or element may have certain properties that are associated with the actor or element. For example, a property may be a transform. Transforms may be automatically modified according to various embodiments, or may even be user modified. Example transforms for a graphical element (e.g., image, vector graphics (2D or 3D)) may include: position, size/scale, color, background, font type, opacity, 2D transformation (e.g., rotation, translation, skewing, etc.), and/or 3D transformation, among others. In some cases, a given transform that is associated with an actor may allow the actor to be animated.

Modifying the transform may include modifying the transform corresponding to at least one of the replicate entries in the display list. For example, in the example above in which a single element was split into three sub-elements, the transform corresponding to at least one (e.g., 1, 2, or all 3) of the sub-elements may be modified in the display list and/or animation timeline. As one example, modifying may include adjusting a center point of at least one of the sub-elements. As another example, modifying may include adjusting coordinates of a translation.

In one embodiment, modifying may include determining that a sub-element was split from an element that is referenced in an animation timeline. The timeline may include an instruction associated with the element that defines the transform. As a result, the instruction may be replicated for each sub-element that resulted from the splitting of the element. Note that if one of the sub-elements is a modified version and not a replication of the original element, then its instruction may not need to be replicated. It may or may not be modified at block 540. Continuing the simple example from above, an instruction may have been a scale of element A at time t=5 seconds. That instruction may be replicated such that each of sub-elements A1, A2, and A3 include a scale at time t=5 seconds.

In situations in which the actors are images, divs may be used in place of images in the data structure and animation timeline. CSS may be used to place the image as a background at specific offsets so that when rendered, the divs may appear as if they are a single image. The setup transformations and tweens for the original actor/image may be duplicated for each div. The various transforms and tweens may be adjusted in such a manner that each sub-element will animate in tandem so that it is indistinguishable from the original actor that was split.

In one embodiment, various transforms that may be altered at block 540 may include translateX, translate, and transform-origin, among others. After replication of the divs and adjustment of the transforms and/or tweens, the divs and adjusted transforms may be inserted into the data structure (e.g., a data structure that defines timelines, actors, and tweens/transforms) so that they appear in the same stacking order as the original actor that was split.

As an example of the modifying of block 540, consider a scenario in which an actor A is split into sub-elements A1 and A2. A transform associated with actor A indicated a move from position 0 to position 100. In an example in which the actor A is split directly in half, sub-element A1 may still move from 0 to 100 but sub-element A2 may have its move modified to be from 50 to 150. Note that although the foregoing simple example is described in terms of a move in a single dimension, moves and/or other transforms may occur in multiple dimensions.

In some embodiments, the plurality of sub-elements may be rendered in a single pass and the rendered sub-elements may be provided for compositing, e.g., to a GPU. Accordingly, the plurality of sub-elements may be passed to the GPU as textures, or for 3D, as image textures. In an embodiment in which the textures are provided to a GPU for compositing, the GPU may composite the textures into a frame buffer of a display for display of the animation. The GPU may blit images directly into screen memory. As the GPU receives new textures representing updated elements and/or sub-elements, the GPU may replace the corresponding pixel data in screen memory.

In various embodiments, blocks 520-540 may be performed at run-time upon loading of the content. For example, a browser may load content that includes one or more animated elements. Upon loading, the method of FIG. 5 may be performed automatically. The resulting animation may be free of checker boarding, flashing, and other discontinuities. In other embodiments, one or more of blocks 510-540 may be performed at the time of creation of the animation (e.g., by animation creation software).

In various embodiments, method 500 may equally apply to non-image elements, such as elements that can be simulated in multiple pieces as pixel data. Examples may include vector graphics, rectangles, ellipses, circles, rounded rectangles, and dividable objects in a container.

The disclosed dynamic content splitting may allow a content creator to create animated content without regard to element size limitations yet still take advantage of hardware acceleration without checkerboard-type glitches. Moreover, as various systems may have different size limitations, the disclosed techniques may dynamically adapt to a system's components and split content accordingly. As a result, at run-time an animation may be optimized for the needs of a specific platform. Further, by performing the disclosed techniques, the split actors may be animated in tandem such that the split actors appear to be a single actor.

Figure 3:
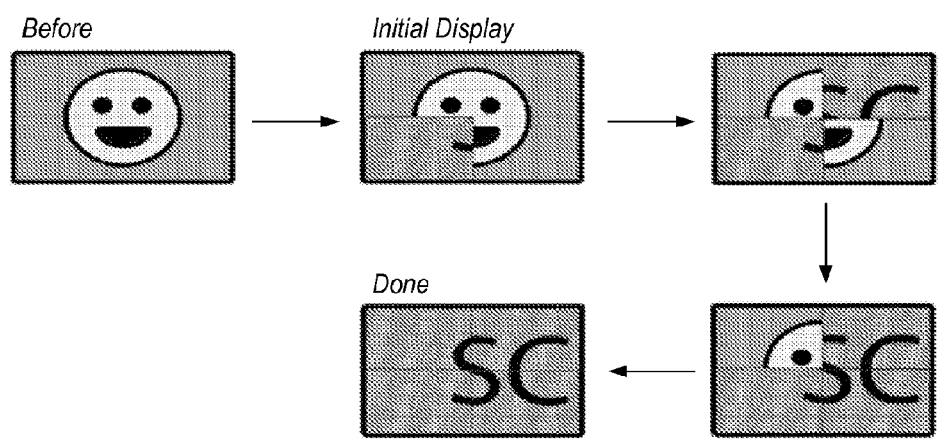
FIG. 3 illustrates example checker boarding from the tiling of FIGS. 2A-2C.
Figure 7:
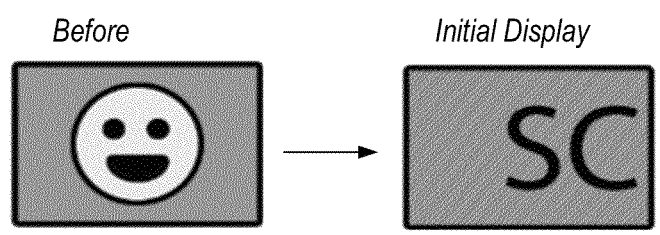
FIG. 7 illustrates an example before and after of an animation, according to some embodiments.

FIG. 7 illustrates an example before and after of an animation, according to some embodiments. The first image shows the first scene in a transition animation. Note that compared to FIG. 3, the display is updated without checker boarding because the sub-elements in FIG. 7 were all rendered in a single pass after the browser performs its layout. This means that, at the time the sub-elements are displayed, the bitmap provided to the GPU is fully rendered and ready to display immediately. Additionally, because of the splitting and modifying of blocks 530 and 540, the actors appear in tandem as if they were unsplit.

Figure 8A:
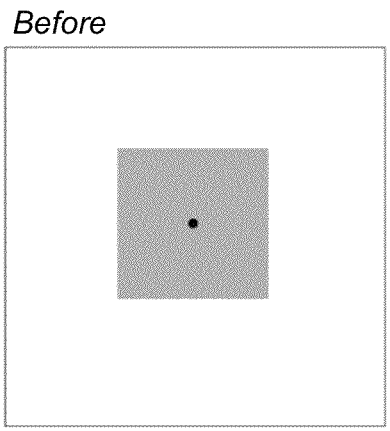
FIGS. 8A-8B illustrate an example before and after of a rotate transform on a single actor.
Figure 8B:
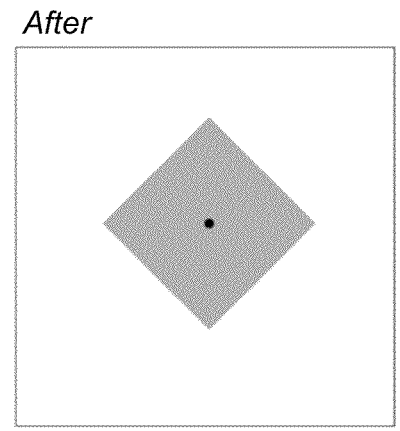

FIGS. 8A-8B illustrate an example before and after of a rotate transform on a single actor. As shown, the entire actor rotates together because it is a single actor.

Figure 9A:
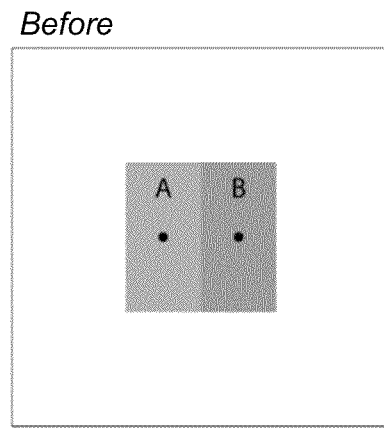
FIGS. 9A-9B illustrate an example before and after of a rotate transform on a split actor with no center-point adjustments.
Figure 9B:
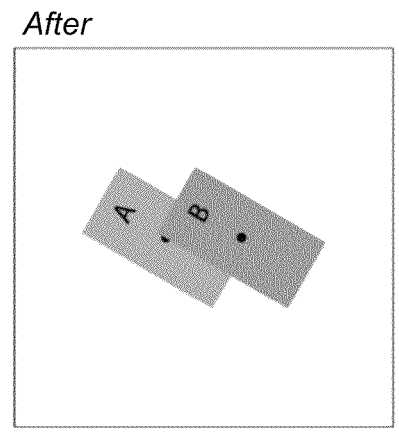

FIGS. 9A-9B illustrate an example before and after of a rotate transform on a split actor with no center-point adjustments. As a result, the sub-elements A and B appear broken and do not move continuously as if a single actor.

Figure 10A:
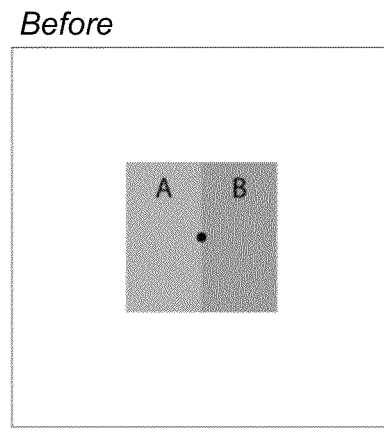
FIGS. 10A-10B illustrate an example before and after of a rotate transform on a split actor with center-point adjustments, according to some embodiments.
Figure 10B:
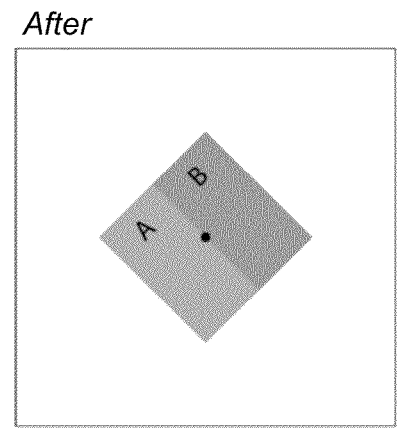

FIGS. 10A-10B illustrate an example before and after of a rotate transform on a split actor with center-point adjustments, according to block 540. As a result of the center-point adjustment, the split actor may rotate as if it were a single actor and appear to a viewer of the displayed content as if it were a single, unsplit actor.

A Computer System

Figure 11:
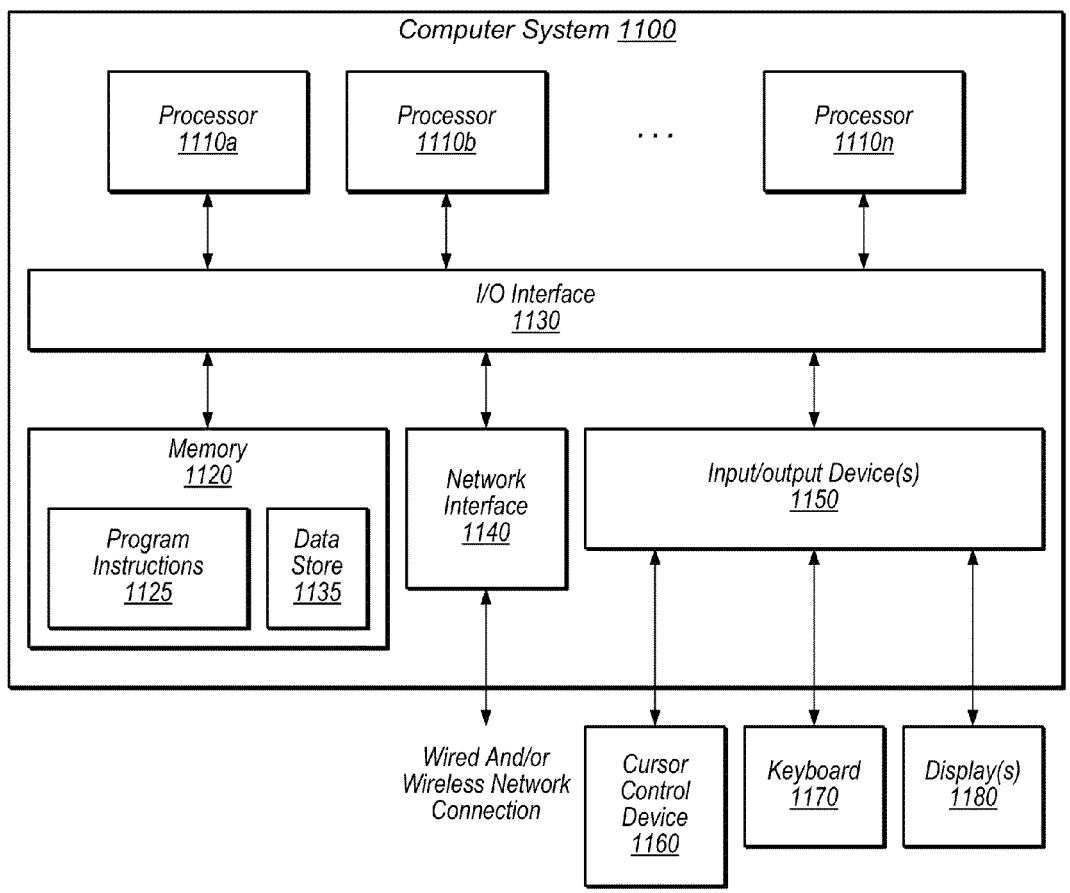
FIG. 11 is a block diagram of a computer system configured to implement systems and methods disclosed herein according to some embodiments.

Embodiments of a system and method for dynamically splitting content, as described herein, may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some embodiments, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments, processors 1110 may be general-purpose or embedded processors implementing any of a variety of instruction set architectures (ISAs), such as the x136, PowerPC®, ARM®, SPARC®, or MIPS® ISAs, or any other suitable ISA. In multiprocessor systems, each of processors 1110 may commonly, but not necessarily, implement the same ISA.

In some embodiments, at least one processor 1110 may be a graphics processing unit. A graphics processing unit, or GPU, may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA® Corporation, ATI® Technologies (AMD®), and others.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an animation module (such as animation engine 420) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. Generally speaking, a computer-accessible medium may include storage media or memory media such as magnetic or optical media—e.g., disk or CD/DVD-ROM coupled to computer system 1100 via I/O interface 1330. Program instructions and data stored on a non-transitory computer-accessible medium may further be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 (e.g., "user input 412" in FIG. 4) may, in some embodiments, include one or more display terminals, keyboards, keypads, touchpads, scanning devices, voice or optical recognition devices, or any other devices suitable for entering or retrieving data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125, configured to implement certain embodiments described herein, and data storage 1135, comprising various data accessible by program instructions 1125. In an embodiment, program instructions 1125 may include software elements of embodiments illustrated in the above figures. For example, program instructions 1125 may be implemented in various embodiments using any desired programming language, scripting language, or combination of programming languages and/or scripting languages, e.g., C, C++, C#, Java™, JavaScript™, Perl, etc. Data storage 1135 may include data that may be used in these embodiments. In other embodiments, other or different software elements and data may be included.

A person of ordinary skill in the art will appreciate that computer system 1100 is merely illustrative and is not intended to limit the scope of the disclosure described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A person of ordinary skill in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the disclosure embrace all such modifications and changes and, accordingly, the above description to be regarded in an illustrative rather than a restrictive sense.

What is claimed is:

1. A non-transitory computer-readable storage medium storing program instructions, the program instructions computer-executable to implement operations comprising:
   receiving content that includes an element to be animated;
   receiving a transform to change an appearance of the element; and
   responsive to a determination that a size of the element exceeds a threshold, implementing operations comprising:
      splitting the element into a plurality of sub-elements;
      modifying the transform for at least one of the plurality of sub-elements to create one or more modified transforms for the at least one of the plurality of sub-elements, the modified transforms comprising one or more alterations to one or more properties of the at least one of the plurality of sub-elements to change the appearance of the at least one of the plurality of sub-elements; and
      utilizing the modified transforms to mimic transformation of the element as defined by the transform.

2. The non-transitory computer-readable storage medium of claim 1, wherein the program instructions are further computer-executable to implement operations comprising rendering the plurality of sub-elements in a single pass.

3. The non-transitory computer-readable storage medium of claim 1, wherein the content is received as a display list, wherein said splitting includes replicating an entry of the element in the display list, the replicating including replicating a transform associated with the element.

4. The non-transitory computer-readable storage medium of claim 1, wherein said splitting results in each of the plurality of sub-elements having a size that falls below the threshold.

5. The non-transitory computer-readable storage medium of claim 1, wherein said modifying includes adjusting a center point of each of the plurality of sub-elements.

6. The non-transitory computer-readable storage medium of claim 1, wherein said modifying includes modifying an instruction corresponding to the at least one sub-element in an animation timeline associated with the content.

7. The non-transitory computer-readable storage medium of claim 1, wherein the plurality of sub-elements are ordered in a data structure in a same stacking order as the element was originally ordered among two or more elements to be animated in the data structure when the data structure contains two or more elements to be animated.

8. The non-transitory computer-readable storage medium of claim 1, wherein the program instructions are further computer-executable to implement operations comprising providing a single-pass rendering of the plurality of sub-elements to a graphics processing unit (GPU) configured to composite the rendering for display.

9. The non-transitory computer-readable storage medium of claim 1, wherein said determining, splitting, and modifying are performed at run-time upon receiving the content.

10. The non-transitory computer-readable storage medium of claim 1, wherein said splitting is performed according to a technique that minimizes a number of the plurality of sub-elements.

11. The non-transitory computer-readable storage medium of claim 1, wherein the threshold is a maximum size limit in at least one dimension, the threshold dependent on a graphics processing unit (GPU) limitation.

12. The non-transitory computer-readable storage medium of claim 1, wherein the program instructions are further computer-executable to implement, prior to said determining, operations comprising determining the threshold based on components of a graphics pipeline.

13. A method, comprising:
   receiving content that includes an element to be animated;
   receiving a transform to change an appearance of the element; and responsive to determining that a size of the element exceeds a threshold:

splitting the element into a plurality of sub-elements;

modifying the transform for at least one of the plurality of sub-elements to create one or more modified transforms for the at least one of the plurality of sub-elements, the modified transforms comprising one or more alterations to one or more properties of the at least one of the plurality of sub-elements to change the appearance of the at least one of the plurality of sub-elements; and utilizing the modified transforms to mimic transformation of the element as defined by the transform.

14. The method of claim 13, further comprising rendering the plurality of sub-elements in a single pass.

15. The method of claim 13, wherein the content is received as a display list and said splitting includes replicating an entry of the element in the display list, the replicating including replicating a transform associated with the element.

16. The method of claim 13, wherein said splitting includes splitting the element one or more times until each sub-element falls under the threshold, the splitting performed according to a technique that minimizes a number of the plurality of sub-elements.

17. The method of claim 13, wherein said modifying includes modifying an instruction corresponding to the at least one sub-element in an animation timeline associated with the content.

18. The method of claim 13, further comprising prior to said determining, determining the threshold based on components of a graphics pipeline.

19. A system, comprising:

at least one processor; and a memory comprising program instructions, wherein the program instructions are executable by the at least one processor to perform operations comprising:

receiving content that includes an element to be animated;

receiving a transform to change an appearance of the element; and responsive to a determination that a size of the element exceeds a threshold, perform operations comprising:

splitting the element into a plurality of sub-elements;

modifying the transform for at least one of the plurality of sub-elements to create one or more modified transforms for the at least one of the plurality of sub-elements, the modified transforms comprising one or more alterations to one or more properties of the at least one of the plurality of sub-elements to change the appearance of the at least one of the plurality of sub-elements; and utilizing the modified transforms to mimic transformation of the element as defined by the transform.

20. The system of claim 19, wherein the program instructions are further executable by the at least one processor to implement operations comprising rendering the plurality of sub-elements in a single pass.

* * * * *